United States Patent
Kambouris (10) Patent No.: US 8,910,836 B2
(45) Date of Patent: Dec. 16, 2014

(54) VALVE ASSEMBLY

(76) Inventor: Ambrosios Kambouris, Mildura (AU)

( * ) Notice: Subject to any disclaimer, the term of this patent is extended or adjusted under 35 U.S.C. 154(b) by 0 days.

(21) Appl. No.: 13/635,617

(22) PCT Filed: Mar. 18, 2011

(86) PCT No.: PCT/AU2011/000309
§ 371 (c)(1),
(2), (4) Date: Sep. 17, 2012

(87) PCT Pub. No.: WO2011/113112
PCT Pub. Date: Sep. 22, 2011

(65) Prior Publication Data
US 2013/0008532 A1    Jan. 10, 2013

(30) Foreign Application Priority Data
Mar. 19, 2010    (AU) ................................ 2010901148

(51) Int. Cl.
B65D 5/72       (2006.01)
B65D 47/20      (2006.01)
F16K 7/07       (2006.01)
F16K 7/06       (2006.01)

(52) U.S. Cl.
CPC ............ *F16K 7/075* (2013.01); *B65D 47/2037* (2013.01); *F16K 7/06* (2013.01)
USPC .......... 222/494; 222/212; 222/214; 251/61.1; 137/853

(58) Field of Classification Search
CPC ............ A61M 1/1037; A61M 5/16809; B05B 1/3013; B65D 47/04; B65D 47/205; F04B 43/0045; F04B 43/0018; F04B 43/0072; F04B 43/084; F04B 43/086; F04B 43/107; F04B 43/113; F04B 43/1133; F04B 43/06; F04B 43/067; F04B 43/073; F04B 43/0733; F16K 15/144; F16K 15/14; F16K 15/145; F16K 7/17; F16K 7/075
USPC ........... 222/52, 182, 632, 205, 206, 207, 209, 222/212–215, 494; 137/853, 843, 860; 251/62, 61.1, 5; 604/163; 239/269
See application file for complete search history.

(56) References Cited
U.S. PATENT DOCUMENTS

| | | | | |
|---|---|---|---|---|
| 3,286,977 A | * | 11/1966 | Miottel | 251/46 |
| 3,477,693 A | * | 11/1969 | Bezanis | 251/251 |
| 3,747,637 A | * | 7/1973 | Mollere | 137/594 |
| 3,760,843 A | * | 9/1973 | Larner | 137/596.15 |
| 3,934,611 A | * | 1/1976 | Gachot et al. | 137/884 |
| 4,070,004 A | * | 1/1978 | Friswell | 251/331 |

(Continued)

*Primary Examiner* — Paul R Durand
*Assistant Examiner* — Randall Gruby
(74) *Attorney, Agent, or Firm* — Sand & Sebolt (57) ABSTRACT

A valve assembly for dispensing liquid from a container. A manifold includes a first channel extending downwardly from a first inlet to a first side outlet, and a second channel extending downwardly from a second inlet on the manifold to a second outlet. The first side outlet and the second inlet are located on the same horizontal plane in reference to the longitudinal axis of the manifold. An elastic membrane sheathed around the manifold extends over the first side outlet and the second inlet. External fluid pressure causes the membrane to expand under fluid flow to provide for fluid communication through the manifold. In alternate embodiments fluid pressure flowing through the first and second channels causes the elastic membrane to expand enabling fluid communication between the first side outlet and the second inlet. A sealing sleeve extends around the elastic membrane is movable from a first to a second position.

5 Claims, 9 Drawing Sheets

(56) References Cited

U.S. PATENT DOCUMENTS

| | | | |
|---|---|---|---|
| 4,102,355 A * | 7/1978 | Hansen | 137/596.15 |
| 4,119,120 A * | 10/1978 | Mehaffy et al. | 137/885 |
| 4,168,724 A * | 9/1979 | Graffunder et al. | 137/606 |
| 4,274,452 A * | 6/1981 | Schmitt | 141/1 |
| 4,275,765 A * | 6/1981 | Dugas | 137/625.48 |
| 4,289,733 A * | 9/1981 | Saito et al. | 422/227 |
| 4,290,454 A * | 9/1981 | Shetler | 137/853 |
| 4,550,878 A * | 11/1985 | Rosenberg et al. | 239/542 |
| 4,846,810 A | 7/1989 | Gerber | |
| 5,088,901 A * | 2/1992 | Brauer | 417/386 |
| 5,092,855 A | 3/1992 | Pardes | |
| 5,203,368 A * | 4/1993 | Barstow et al. | 137/240 |
| 5,467,529 A * | 11/1995 | Gilchrist et al. | 29/890.128 |
| 5,496,009 A * | 3/1996 | Farrell et al. | 251/61.1 |
| 5,556,386 A * | 9/1996 | Todd | 604/247 |
| 5,588,640 A * | 12/1996 | Romer | 267/64.11 |
| 5,613,517 A * | 3/1997 | Handler | 137/512.4 |
| 5,653,251 A * | 8/1997 | Handler | 137/114 |
| 5,660,370 A * | 8/1997 | Webster | 251/129.17 |
| 5,762,314 A * | 6/1998 | Williams | 251/25 |
| 5,791,375 A * | 8/1998 | Pan et al. | 137/597 |
| 5,794,641 A * | 8/1998 | Pan et al. | 137/1 |
| 6,050,787 A * | 4/2000 | Hesketh | 417/412 |
| 6,059,038 A * | 5/2000 | Vick, Jr. | 166/319 |
| 6,073,482 A * | 6/2000 | Moles | 73/53.01 |
| 6,079,449 A * | 6/2000 | Gerber | 137/859 |
| 6,116,465 A * | 9/2000 | Bouzaglo | 222/92 |
| 6,173,735 B1 * | 1/2001 | Perry et al. | 137/489 |
| 6,196,521 B1 * | 3/2001 | Hynes et al. | 251/61.1 |
| 6,234,203 B1 * | 5/2001 | Backlund | 137/597 |
| 6,293,012 B1 * | 9/2001 | Moles | 29/890.124 |
| 6,406,605 B1 * | 6/2002 | Moles | 204/601 |
| 6,668,848 B2 * | 12/2003 | Lafler et al. | 137/1 |
| 6,729,599 B2 * | 5/2004 | Johnson | 251/11 |
| 6,752,172 B2 * | 6/2004 | Lauer | 137/605 |
| 6,766,816 B2 * | 7/2004 | Secondo | 137/1 |
| 6,820,652 B2 * | 11/2004 | Gaydos et al. | 137/860 |
| 7,114,522 B2 * | 10/2006 | Silva | 137/597 |
| 7,607,641 B1 * | 10/2009 | Yuan | 251/331 |
| 8,273,049 B2 * | 9/2012 | Demers et al. | 604/6.11 |
| 2004/0209354 A1 * | 10/2004 | Mathies et al. | 435/287.2 |
| 2007/0255228 A1 | 11/2007 | Secondo | |
| 2008/0142747 A1 * | 6/2008 | Jennings et al. | 251/5 |
| 2010/0021326 A1 * | 1/2010 | Oguma et al. | 417/472 |
| 2010/0224255 A1 * | 9/2010 | Mathies et al. | 137/1 |
| 2011/0079291 A1 * | 4/2011 | Blin et al. | 137/14 |
| 2012/0209183 A1 * | 8/2012 | Gray | 604/131 |

* cited by examiner

VALVE ASSEMBLY

The present invention relates to a valve assembly for use in discharging a liquid or fluid from a container. In particular the present invention provides for a valve assembly that prevents the flow of contaminants through the valve assembly into the container.

BACKGROUND OF THE INVENTION

Whilst the sterile packaging of liquids can be achieved using many means, those containers that allow the liquids to be dispensed through valves face the problem of the liquid content maintaining sterility and preventing oxygen ingress, especially during dispensing. In dispensing sterile fluids from containers it is important to prevent any back flow of contamination into the container during and after the dispensing operation has been carried out. This is particularly important where the container has an extended period of use. If a container of a sterile fluid has a one-time use and is not intended to be dispensed over an extended period of time, the problem of contaminants flowing into the container usually does not exist. However where a container is used for some time, contamination in the form of materials originating from outside of the valve assembly and container may include microorganisms, atmospheric gases, moisture, dust and the like. If the sterile fluid is contaminated it can affect the quality, potency and even safety of the product.

The present invention is directed to a valve assembly for use in discharging a liquid from a container and for preventing any flow of contaminants through the valve assembly into the container. The valve assembly includes a valve body with an elastomeric sheath within the valve that when expanded provides for a liquid flow path for dispensing the liquid from the container.

Maintaining the contents sterile and free of oxygen ingress during dispensing is a challenge for most designers. U.S. Pat. No. 4,846,810 describes a valve assembly that claims to prevent backflow of contaminants including microorganisms and air during and following the dispensing of fluids.

This patent describes a concept of allowing pressurized liquid to pass through a valve body containing channels that make contact with an elastomeric membrane at the surface before entering another channel. This port as it is referred to in the patent, in the absence of liquid pressure, remains tightly pressed against the valve body (elastomeric force), effectively preventing fluid, contaminants or organisms from moving beyond this point. It is claimed that such a valve has been tested and remains aseptic during use for dispensing of liquid. The invention does however have several limitations. These are:

1. That pressure higher than gravity is required to dispense from this valve rendering the invention suitable only for pressurized collapsible containers and not so for gravity dispensed liquids stored within a collapsible bag or a rigid container.
2. The invention although suitable for aseptic dispensing, does not describe any suitable method of opening and shutting the valve in order to maintain sterility of the liquid during valve use. Maintaining sterility requires a chain of mechanisms to be useful such as fluid release control.
3. The valve does not mention the use of a breather for it to be adoptable to more rigid containers such as Poly Ethylene Terephthalate (PET) bottles.

OBJECT OF THE INVENTION

It is an object of the present invention to overcome at least some of the above mentioned problems or provide the public with a useful alternative.

It is a further object of the present invention to provide a valve assembly for a container permitting the dispensing of the fluid while preventing any back flow of contaminants through the valve assembly into the container holding the remaining fluid.

SUMMARY OF THE INVENTION

Therefore in one form of the invention there is proposed a valve assembly including;
  a main inlet and a main outlet;
  at least two enclosed channels, the first channel having an inlet port in communication with the main inlet and an outlet port, said second channel including an inlet port and an outlet port, said second channel outlet port in fluid communication with the main outlet; and
  an elastomeric membrane of a size and shape to seal the outlet port of the first channel and the inlet port of the second channel.

When a fluid is applied under pressure through the valve assembly, it causes the membrane to expand thereby providing a fluid flow path between the main inlet and the main outlet.

In a further form of the invention there is proposed a valve assembly including;
  a main inlet and a main outlet;
  a central core having at least two enclosed channels, the first channel having an inlet port in communication with the main inlet and an outlet port, said second channel including an inlet port and an outlet port, said second channel outlet port in fluid communication with the main outlet;
  an elastomeric membrane extending around the central core so as to seal the outlet port of the first channel and the inlet port of the second channel;
  a sealed expandable chamber extending around the elastomeric element and including a non-compressible fluid;
  a means to expand the size of the chamber to thereby cause a negative pressure within the sealed chamber thereby causing the elastomeric membrane to be drawn into the chamber and so providing a fluid flow path between the exit port of the first channel and the inlet port of the second channel causing fluid entering the valve assembly through the main inlet to exit through the main outlet.

In preference the two enclosed channels are embedded in a cylindrical core and are holes extending through the core.

In preference there are multiple channels and multiple membranes with each membrane sealing the exit port of a first channel and the entrance port of the immediately adjoining second channel.

In preference each membrane is housed in a separate chamber, with adjoining chambers having fluid communicating orifices therein between. Thus when the first chamber is expanded a negative pressure extends through the different chambers at a different rate causing progressive drawing of the different membranes and thus progressive fluid flow through the valve.

In preference the means to expand the chamber includes a cylinder sealingly housing a piston, said piston movable within the cylinder to enlarge the size of the chamber.

In a further form of the invention there is proposed a valve assembly for dispensing liquid from a container said valve assembly including:

a manifold having a first channel extending downwardly from a first inlet to a first side outlet on the manifold, a second channel extending downwardly from a second inlet on the manifold to a second outlet, the first side outlet and the second inlet located on the same horizontal plane in reference to the longitudinal axis of the manifold;

an elastic membrane sheathed around at least a part of the manifold to extend over the first side outlet and the second inlet wherein fluid pressure flowing through the first and second channels causes the elastic membrane to expand enabling fluid communication between the first side outlet and the second inlet;

a sealing sleeve extending around the elastic membrane and adapted to be moved from a first to a second position wherein in the first position it engages the elastic membrane adjacent the first side outlet and the second inlet to prevent the elastic membrane form expanding and sealing the valve assembly and wherein in the second position it provides for a cavity for the membrane to expand into.

In preference the sealing sleeve includes sealing rings and the sealing sleeve is moved in the longitudinal axis direction to cause the sealing rings to align with the first side outlet and the second inlet.

In preference the sealing sleeve includes longitudinal protrusions, the sealing ring being adapted to be rotatable to cause the alignment of the protrusion with the first side outlet and the second inlet in the first position to mechanically prevent the elastic membrane from expanding and in a second position to provide for a cavity for the expansion of the membrane.

In preference there are more than two channels with the outlet ports and the inlet ports of adjacent channels all located on the same horizontal plane and adapted to be sealed by the membrane.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

LIST OF COMPONENTS 10 valve
12 body
14 inlet
16 outlet
18 chamber
20 chamber
22 chamber
24 entrance for chamber 22
26 exit for chamber 26
28 elastic membrane (TEM)
30 chamber
32 chamber
34 chamber
36 entrance port of outlet 16
38 cylinder
40 piston
42 aperture
44 liquid
46 flow path
48 stretched TEM
50 air
52 small aperture
54 aperture
56 fluid flow path
58 exit port of chamber 18
60 entrance port of chamber 20
62 valve manifold
64 locking spout
66 sealing sleeve
68 retention ring
70 sealing ring
72 cavity
74 flow channels
76 outlet port
78 sealing protrusions
80 inlets
82 outlets

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts. Dimensions of certain of the parts shown in the drawings may have been modified and/or exaggerated for the purposes of clarity or illustration.

Figure 1:
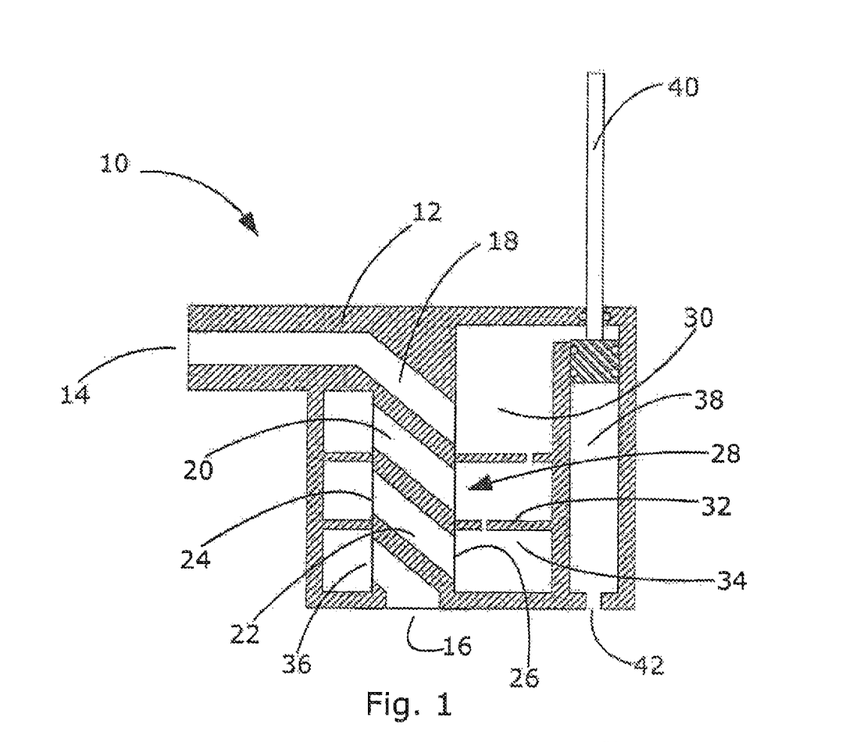
FIG. 1 is a cross-sectional view illustrating an embodiment of the present invention when the valve is sealed and at rest.

Turning now to the drawings in detail there is illustrated in FIG. 1 the valve 10 of the present invention. The valve includes a body 12 having an inlet 14 and an outlet 16 used to dispense a liquid. Located between the inlet and the outlet ports are multiple chambers 18, 20 and 22 each having an entrance and an exit, such as entrance 24 and exit 26 for chamber 22. These chambers may take any cross-sectional shape, but typically they are circular holes that extend at a downward angle to the valve body so that fluid can flow down the chambers due to gravity. Covering over each of the entrance and exit ports is a tubular elastomeric membrane (TEM) 28. The TEM is stretched tightly across all of the ports and seals the outlet of the ports preventing product flowing through the chambers. Of course in the case of the first chamber 18 the TEM does not seal the entrance port. Three chambers are present, each sealed tightly against product passage or bacterial ingress. Each chamber acts as a "trap" against bacteria ingress to the beverage. Of course it is to be understood that the invention is not to be limited to three chambers and there may indeed be a different number of chambers.

The valve assembly further includes chambers 30, 32 and 34 that respectively surround the exit port and adjoining entrance port of sequential chambers. Thus chamber 30 surrounds exit port of chamber 18 and the entrance port of chamber 20, chamber 32 surrounds exit port of chamber 20 and entrance port of chamber 22 and chamber 34 surrounds exit port of chamber 22 and the entrance port 36 of outlet 16. When the TEM seals all of the entrance and exit ports no liquid can be dispensed and the valve ensures that no contamination of the liquid can occur. The entrance and exit chambers shall be defined further below.

Figure 2:
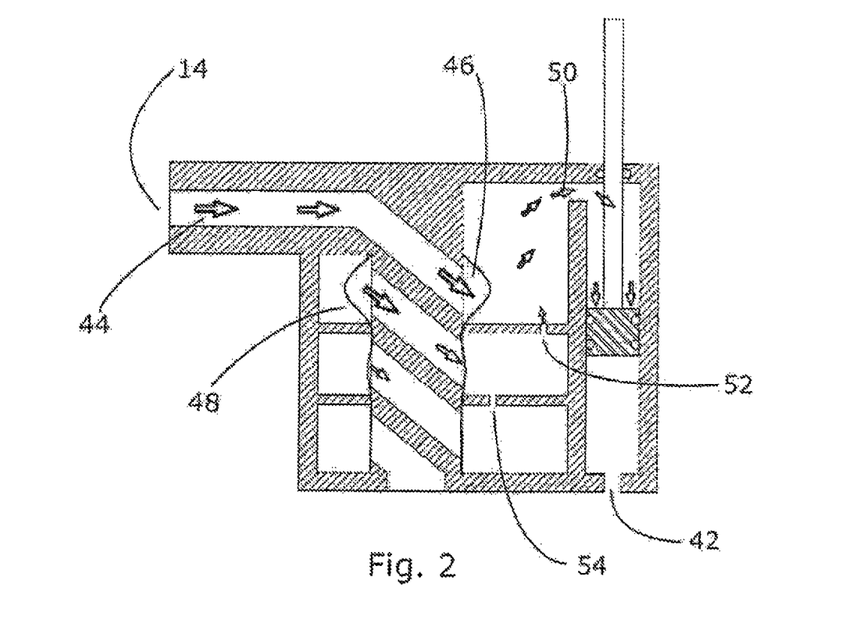
FIG. 2 is the value as in FIG. 1 when the valve is partially operated and the fluid starts to flow through the valve.

Chambers 30, 32 and 34 are filled with an incompressible fluid. The valve assembly further includes a cylinder 38 that is sealingly engaged by a piston 40. The cylinder is in fluid communication with chamber 30. In the closed state the piston is located at the upper end of the cylinder. Upon depression air (or any other fluid) is caused to be forced out of the cylinder through aperture 42. This then causes a reduction of pressure in chamber 30 and with a sufficient drop in pressure causes the TEM that seals the exit port of chamber 18 and entrance port of chamber 20 to be forced under pressure into chamber 30. Assuming that the TEM flexes uniformly this then provides a flow path between the exit port of chamber 18 and the entrance port of chamber 20. This is best illustrated in FIG. 2 where liquid 44 flows through the flow path 46 defined by the stretched TEM 48 caused by the de-pressurising of chamber 30 by flow of air 50.

Figure 3:
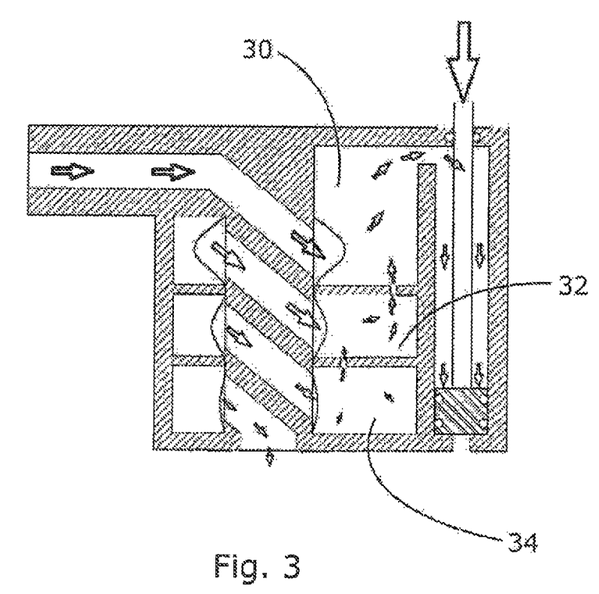
FIG. 3 is the valve as in FIG. 1 when the valve is fully operated and the fluid starts to flow out of the valve.
Figure 4:
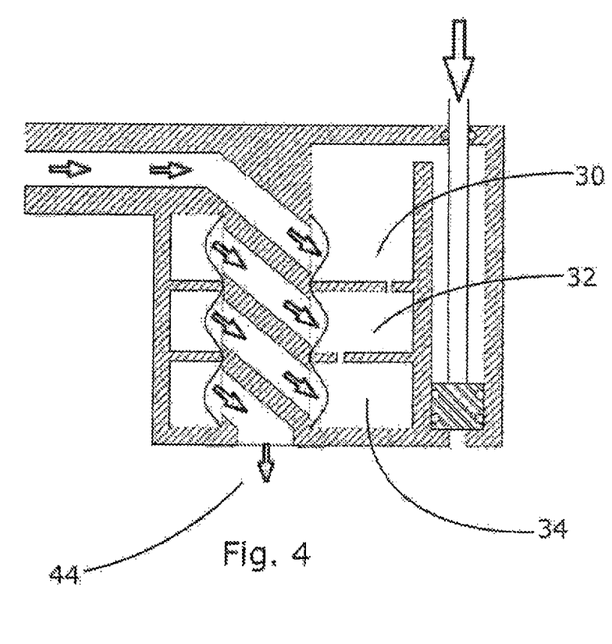
FIG. 4 is the valve of FIG. 1 when fluid has begun to be dispensed through the valve.

Chamber 30 is in fluid communication with chamber 32 through small aperture 52, with chamber 32 being in fluid communication with chamber 34 through aperture 54. The size of apertures 52 and 54 is chosen so that it takes time for the three chambers to achieve equal pressure. This results in the TEM covering the ports as discussed above to do so in a progressive manner. Thus as illustrated in FIG. 3 where the TEM covering the exit port of chamber 20 and entrance port of chamber 22 has just started to expand into chamber 32 causing the fluid flow to progress further. Finally as illustrated in FIG. 4 after some time the chambers 30, 32 and 34 are at an equal pressure causing all of the TEM's to expand into the respective chambers by the same amount enabling liquid 44 to freely flow out of the valve.

Figure 6:
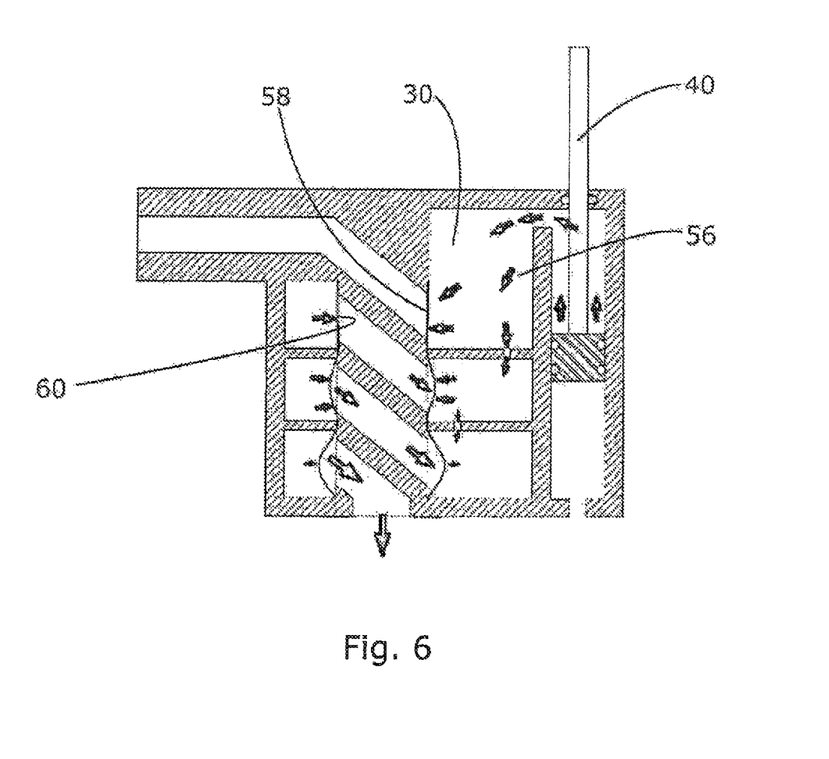
FIG. 6 is the valve of FIG. 1 when the volume of fluid flowing through the valve is reduced.
Figure 7:
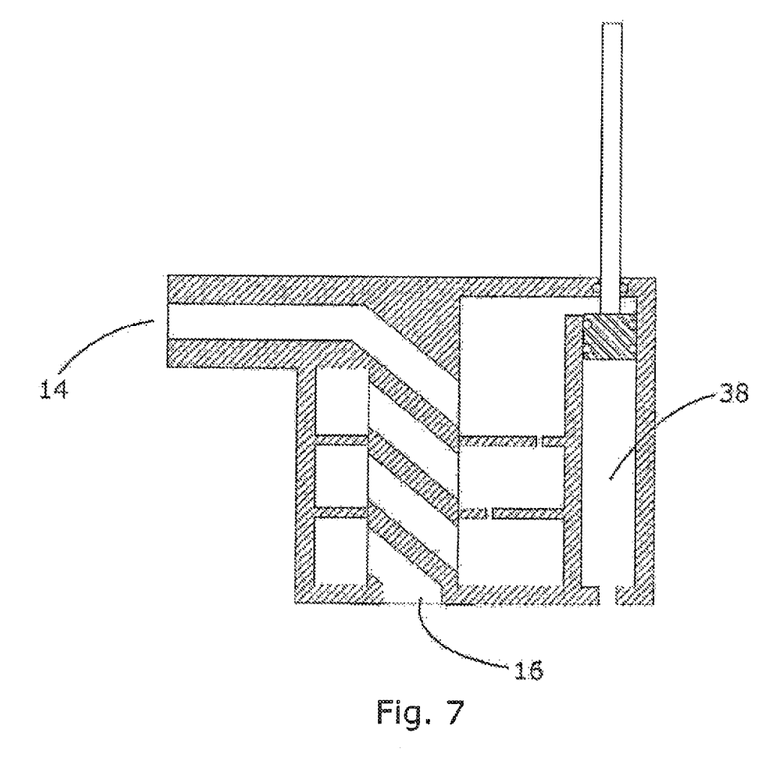
FIG. 7 is the valve of FIG. 1 when it has been fully closed.

To close the fluid flow the opposite process is repeated. The piston is moved upwards to pressurise chamber 30 through fluid flow 56. When the pressure in chamber 30 equals that in chamber 18 the TEM starts to collapse closing of the exit port 58 of chamber 18 and entrance port 60 of chamber 20 stopping any further fluid flow. The remaining fluid flows on to the adjoining chambers until all of the TEM's have collapsed when the pressure has been equalised along all chambers 30, 32 and 34. The reader can appreciate that operation in FIGS. 6 and 7.

Hence in operating the valve assembly the operator pushes down on piston 40, drawing non-compressible fluid behind the piston. The elastic membrane in chamber 30 is drawn open to make up for the reduction in volume that has flown into the cylinder behind the piston. The TEM is stretched to a wider diameter and the elastic resistance causes a vacuum in chamber 30, and resistance to the operator activation of the piston. The diameter of the piston is chosen such that total vacuum could be achieved with low operator activation force.

When the piston is fully depressed, an action that may take less then one second, the TEM in chamber 30 is strained further than in chambers 32 and 34. A lower pressure exists in chamber 30 than 32, and pressure in chamber 32 is less than chamber 34. This is caused by the pressure drop of the fluid passing through the orifices 52 and 54.

The pressure drop of each orifice causes the desired opening lag of TEM in chamber 34, which lags TEM in chamber 32 opening, which lags the opening of the TEM chamber 32. This is desired to ensure when the final product outlet to atmosphere is opened, product flows to preventing bacterial ingress.

Figure 5:
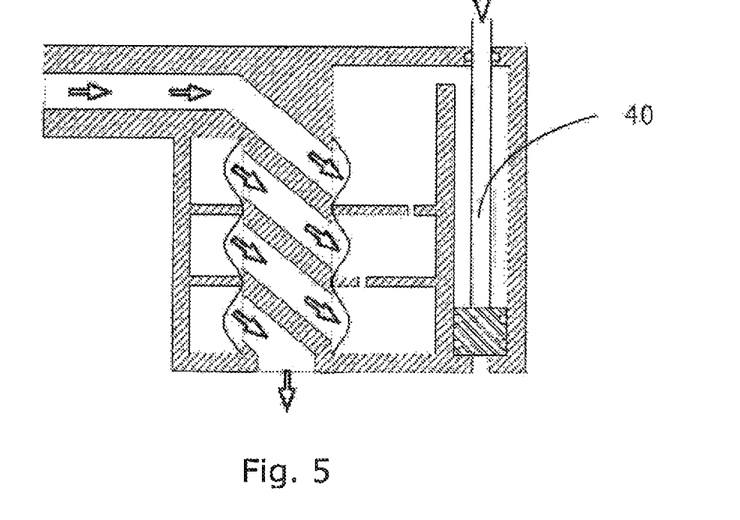
FIG. 5 is the valve of FIG. 1 when the valve is operated to start stopping the flow of fluid through the valve.

As illustrated in FIG. 5, when the piston (or button) is held down during dispensing the operator activation force is in equilibrium with the elastic potential energy of the TEM's. Pressure in each of the three incompressible fluid chambers 30, 32 and 34 naturally reaches equilibrium. The TEM in each chamber is open the same amount. The volume of fluid displaced by the piston equals the increase in volume of the TEM from its diameter growing. The TEM is held open purely by the vacuum caused by operator activation force on the piston. Product is free to flow through the aseptic tap body, only needing to overcome friction losses associated with tortured path. The product pressure does not need to force open the TEM. Consequently this can be used as gravity flow valve, not requiring product pressure.

To stop the dispensing of the liquid the operator releases activation force on the piston. The TEM's begins to constrict, the constriction changing the volume in the incompressible fluid chamber, consequently drawing up the piston. The fluid is drawn back into each chamber by the constricting TEM.

The fluid takes longer to be drawn into chamber 34 than chamber 32, and chamber 32 takes longer to draw the fluid back into the chamber than does chamber 30. The TEM's cannot close until the all the fluid is drawn back into the chamber, and the piston reaches top of the stroke again. This causes the desired lag time in closing of the TEM bacteria traps.

The TEM in chamber 30 will close first, there being no flow resistance in drawing fluid into chamber 30. Piston 40 is drawn up due to the change in volume of chamber 30 only. Whilst that TEM is constricting, product flow continues through the other TEM's as these remain open.

The next TEM will then close, the fluid resistance through orifice 52 causing a lag in closing compared to the TEM in chamber 30. Whilst constricting, product flow will be continue exiting the last TEM in chamber 34 and the one in chamber 30 has now shut.

The TEM in chamber 34 will close last, fluid flow through both orifices 52 and 54 causing the greatest lag. Whilst constricting, product will continue to flow from the outlet 16.

During the closing sequence of the TEM's, or traps, the purposeful lag in TEM trap closings causes a continual flow of product from the outlet. This product outflow prevents bacterial ingress, and is why the sequential trap closing is desired.

A biasing means, such as a spring (not shown) may be located so to act on the piston to push it up therefore forcing the elastomer to close via force transfer through fluid to the elastomeric membrane.

The reader will now appreciate the advantages of the present invention including the following:
1. Opening and closing the valve manually whilst maintaining sterility.
2. Hydraulically operating to open, close and sequentially, in predefined order, operate the valve ports to maintain positive pressure at all times of operation, effectively decreasing the probability even further of contamination into the stored liquid.
3. Manually achieve what the hydraulically operating system achieves. This is a variation of design using similar concept as the hydraulic design.
4. Including in certain applications a breather for the basic valve can be incorporated with the basic valve so that it can filter air through to the dispensing container to replace fluid or liquid loss as a result of dispensing.
5. Gravity and high pressure dispensing from a collapsible container and even dispensing from a semi-rigid containers such as PET bottles with a basic valve having a sterile air filter incorporated.

The basic valve can also vary in shape. Shapes such as cylindrical, cone or horseshoe and others that are not described here.

In another variation of the invention, the channels can be made totally on the surface, between the valve body and the elastomeric membrane. The number of channels could be at least one or more in number. The elastomeric membrane can either be stuck by heat to the valve, glued or simply remain in place by the force against the valve. The valve body and elastomeric membrane can be made from any suitable material or make use of antimicrobial plastics or other materials or new materials which contain antimicrobial constituents embedded.

In another variation of the invention, the valve can have more than one liquid entry channel. For example, in one inlet channel, liquid flows and by valve/tap rotation, the liquid flow is stopped and the second inlet fluid or gas, used to disinfect and remove liquid residues can pass through to clean the valve body.

In a further variation to the invention the piston may be biased by a mechanical means, such as a spring. Without a spring, the total vacuum in pressure to open the tubular membrane may be limited to a small amount. With a spring the hydraulic liquid can be pressurised by greater than atmospheric pressure.

Whilst not limiting the invention to any particular measurements it is expected that a sealing pressure of some 30 kPa will be applied and that an operator driven piston may provide up to −90 kPa of pressure. As to the dimensions of the valve, the valve body can be typically 10mm diameter and the TEM a 0.18 mm silicon membrane.

It is also to be understood that it is not intended to limit the invention to the embodiment described above. Thus the following may be variations on the concept that is the intention of the present application.

The valve body (plastic body with elastomeric membrane on the outside), may be mechanically operable. In a circular shape it will have a rotary concept within the smaller inner circle that will press the elastomeric membrane shut against the valve body when the rotary tap is turned to the left (one way rotation). This works by having half the rotary tap able to press the elastomeric membrane shut against the same sequence described in the hydraulic version. When the tap is again rotated in the one direction, the mechanical impingement of the elastomeric membrane will lift since half of the tap will not impose any pressure on the elastomeric membrane.

A multiple of spring biasing means may be employed as briefly described above.

The valve body can be of differing size and shape and have any number of internal channels and surface "traps", that is TEM's located within a dedicated chamber.

There can also be a version of the valve that will not have a peristaltic opening/closing motion. In this variation, a mechanical impingement of flow or an on/off system may be included to operate the flow of the valve. The valve body does not necessarily require channels and all flows can be directed between the valve surface and elastomeric membrane, The channels could be one in number to as many as required.

In another version of the invention, there may be the option to add a "breather" passage from outside to the inlet should. The breather can filter and sterilise air going back into a PET bottle after squeezing liquid out of the bottle. The breather can help restore or replace the missing volume in such a PET bottle.

Figure 8:
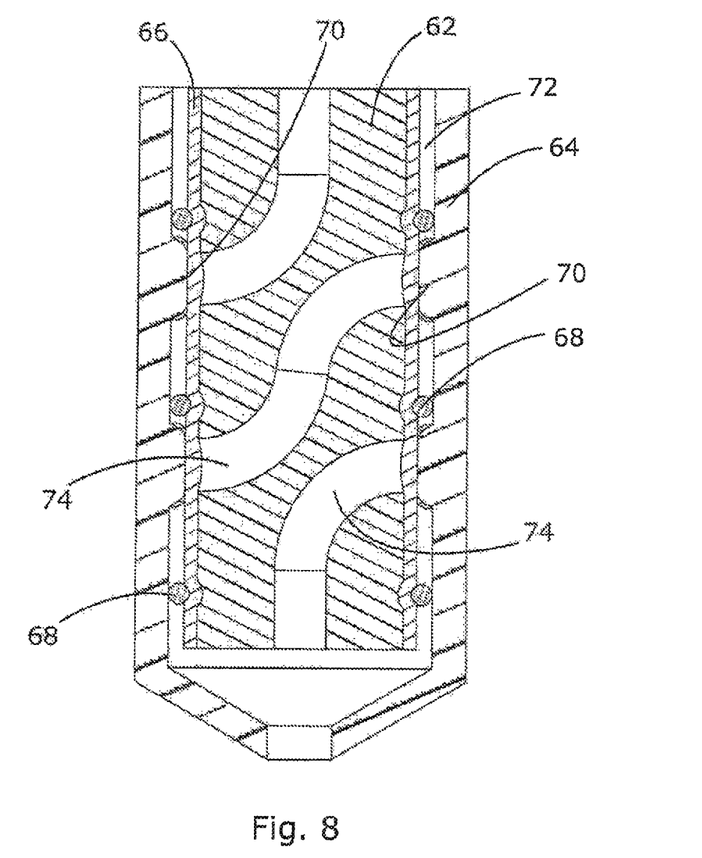
FIG. 8 illustrates a second embodiment of the present invention where the flow of fluid is controlled by a pull/push mechanism and where the valve is in the closed position.
Figure 9:
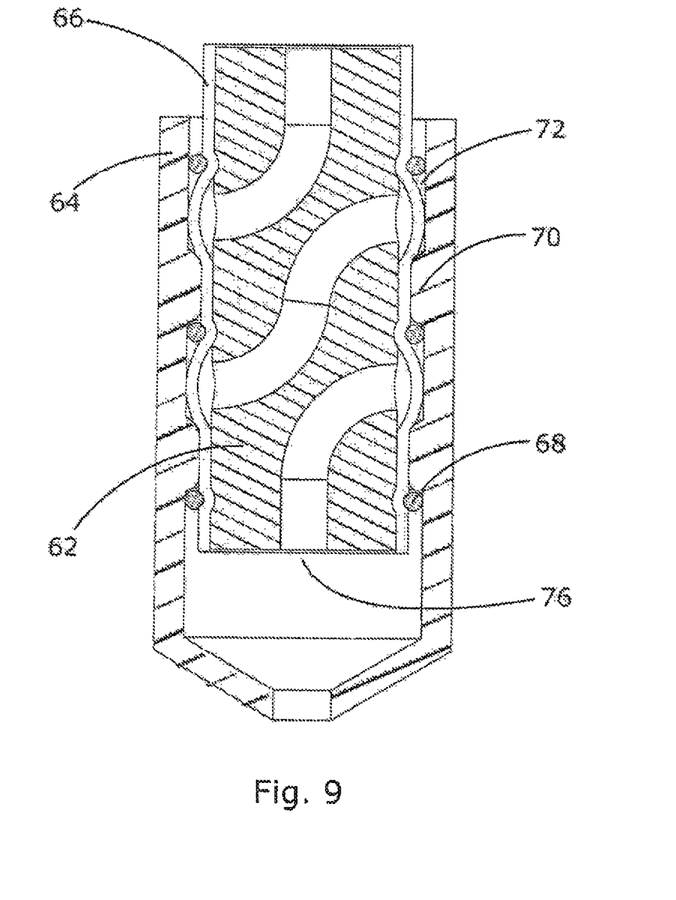
FIG. 9 is the valve as in FIG. 8 but when the valve is in an open position with fluid flowing through the valve
Figure 10:
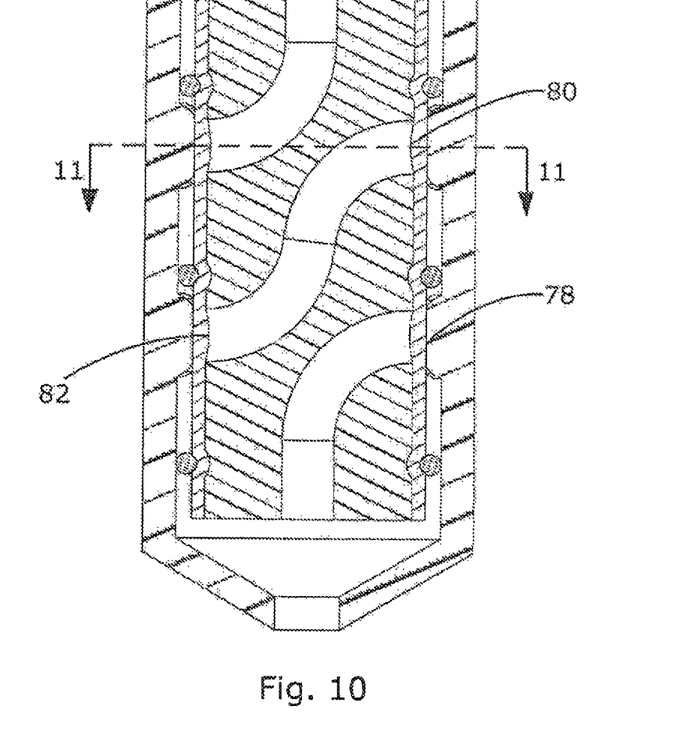
FIG. 10 is a third embodiment of the present invention where the flow of fluid is controlled by a rotatable mechanism and where the valve is in a closed position.
Figure 11:
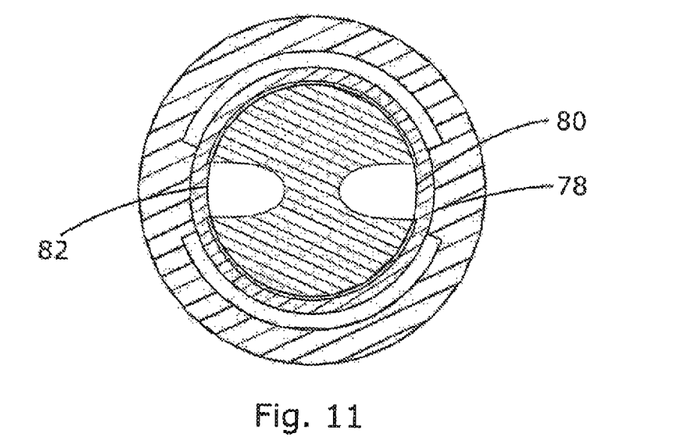
FIG. 11 is a cross-sectional view of the valve as in FIG. 10.
Figure 12:
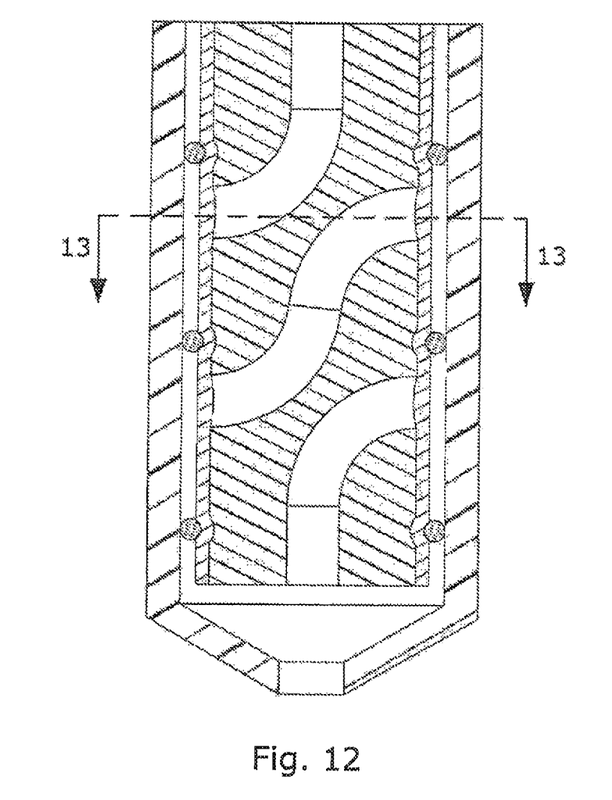
FIG. 12 is the valve as in FIG. 10 but when in an open position before any fluid flows through the valve.

Illustrated in FIGS. 8 and 9 is a second embodiment of the present invention. Here the aseptic valve is prevented from opening by applying a pressure on the membrane 28 (pouch). The valve manifold 62 supports a locking spout 64 that is slidable along the longitudinal axis of the manifold. The sealing sleeve or membrane 66 sheaths the manifold 62 and is held in place by retaining rings 68. The locking spout includes sealing rings or protrusions 70 dimensioned so that when the valve is in the closed position they abut the membrane 66 at the inlets and outlets of the various flow channels 74 thus mechanically preventing fluid from flowing through the valve channels. When the locking spout 64 is slid down as shown in FIG. 9 (although the direction is not important) the sealing rings 70 move to then abut the sleeve 66 against the valve manifold body allowing the sealing sleeve to expand into the cavity 72 defined between the spout and the manifold and thus allowing fluid to flow through the channels in the manifold and out through the outlet port 76

FIGS. 10 to 14 illustrate a similar embodiment as to FIGS. 8 and 9 but where the mechanical operation is achieved by a rotatable action rather then a longitudinal motion.

Figure 13:
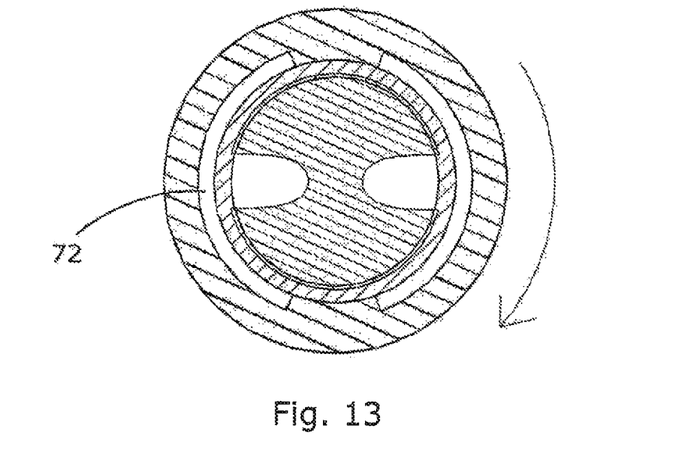
FIG. 13 is a cross-sectional view of the valve of FIG. 12.
Figure 14:
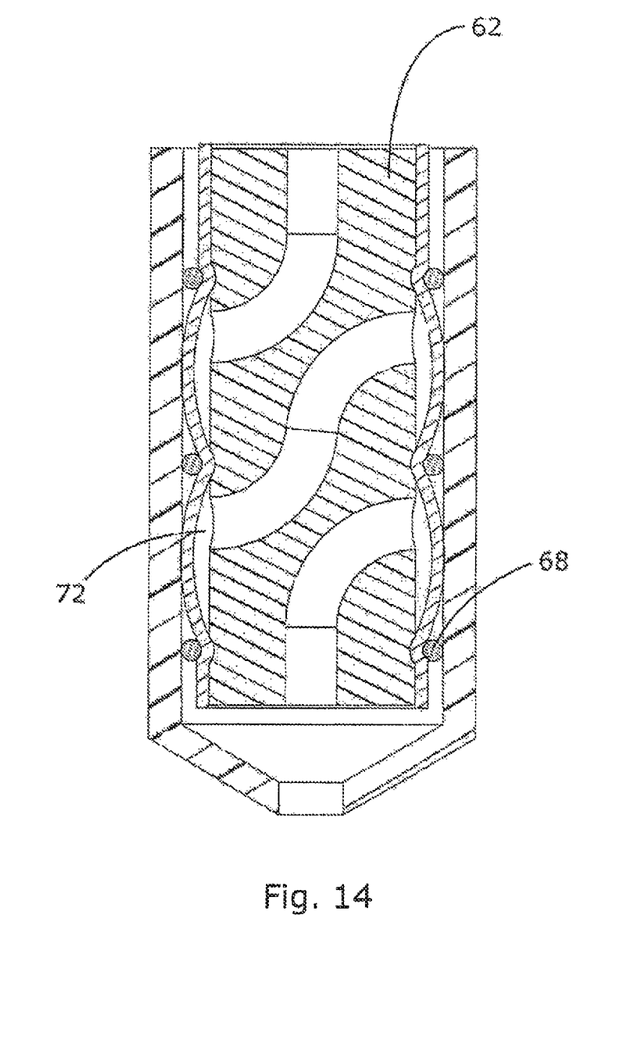
FIG. 14 is the valve as in FIG. 10 but with fluid flowing through the valve

Thus the locking spout 64 includes longitudinal sealing protrusions 78 that can be rotated into position to mechanically seal the inlets 80 and the outlets 82. When rotated out of position as illustrated in FIG. 13, the sealing sleeve can move into the cavity 72 as shown in FIG. 14.

The embodiments in FIGS. 8 to 14 illustrate three flow channels. It is however to be understood that there may be less or more flow channels and that the invention is not limited to a particular number. In addition these further embodiments illustrate the mechanical sealing of the various inlets and outlets. It should be understood that in some circumstances one inlet or outlet may indeed be mechanically sealed. Other times there could be a plurality. Thus the present invention is not to be understood as limiting the invention to all inlet and outlets having to be sealed.

In a further embodiment, not shown, the arrangement of mechanically sealing of the various inlets and outlets may be achieved in a progressive manner. Typically one would first seal the uppermost outlet and then progressively seal the others. This would ensure that any fluid has sufficient time to flow out of the valve manifold so that it does not remain in it and be subject to contamination. This progressive sealing may be achieved by staggering the sealing ring 68 or sealing protrusions 78 so that if the locking spout 64 is slid or rotated the uppermost inlets and outlets would be sealed first.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A valve assembly including;
a main inlet and a main outlet;
a central core having at least two enclosed channels, a first one of the at least two channels having an inlet port in communication with the main inlet and an outlet port; a second one of the at least two channels including an inlet port and an outlet port, said second channel outlet port in fluid communication with the main outlet;
an elastomeric membrane extending around the central core so as to seal the outlet port of the first channel and the inlet port of the second channel;
a sealed expandable chamber extending around the elastomeric element and including a non-compressible fluid;
a means to expand the size of the chamber to thereby cause a negative pressure within the sealed chamber, thereby causing the elastomeric membrane to be drawn into the chamber and so providing a fluid flow path between the outlet port of the first channel and the inlet port of the second channel causing fluid entering the valve assembly through the main inlet to exit through the main outlet; wherein the central core is a cylindrical core and the first and second enclosed channels are embedded in the cylindrical core and are holes extending through the cylindrical core; and wherein the valve assembly includes multiple channels and multiple membranes with each membrane sealing the outlet port of one channel and the entrance port of the immediately adjoining channel; and wherein each membrane is housed in a separate chamber, with adjoining chambers having fluid communicating orifices therein between.

2. The valve assembly as in claim 1 wherein the means to expand the chamber includes a cylinder sealingly housing a piston, said piston movable within the cylinder to enlarge the size of the chamber.

3. A valve assembly including: a main inlet and a main outlet; multiple enclosed channels, a first one of the at least two channels having an inlet port in communication with the main inlet and an outlet port, and a second one of the at least two channels including an inlet port and an outlet port, said second channel outlet port in fluid communication with the main outlet; and an elastomeric membrane of a size and shape to seal either the outlet port of the first channel or the inlet port of the second channel; wherein the elastomeric membrane is of a size and shape to seal both the outlet port of the first channel and the inlet port of the second channel; including multiple membranes with each membrane sealing the outlet port of one channel and the entrance port of the immediately adjoining channel; and wherein each membrane is housed in a separate chamber, with adjoining chambers having fluid communicating orifices therein between.

4. A valve assembly including;
a main inlet and a main outlet;
a central core having multiple channels, wherein at least a first channel has an inlet port in communication with the main inlet and an outlet port; and at least a second channel includes an inlet port and an outlet port, said second channel outlet port being in fluid communication with the main outlet;
multiple elastomeric membranes extending around the central core,
a sealed expandable chamber extending around the elastomeric membrane and including a non-compressible fluid;
a means to expand the size of the chamber to thereby cause a negative pressure within the sealed chamber, thereby causing the elastomeric membrane to be drawn into the chamber and so providing a fluid flow path between the outlet port of the first channel and the inlet port of the second channel causing fluid entering the valve assembly through the main inlet to exit through the main outlet and wherein each membrane seals the outlet port of one of the multiple channels and the entrance port of the immediately adjoining channel and wherein each membrane is housed in a separate chamber, with adjoining chambers having fluid communicating orifices therein between.

5. The valve assembly as in claim 4 wherein the means to expand the chamber includes a cylinder sealingly housing a piston, said piston movable within the cylinder to enlarge the size of the chamber.

* * * * *